United States Patent [19]

Leighton

[11] 4,300,409

[45] Nov. 17, 1981

[54] RESILIENT LEVER ASSEMBLY

[75] Inventor: John D. Leighton, Bloomfield Hills, Mich.

[73] Assignee: Betty Leighton, Bloomfield Hills, Mich. ; a part interest

[21] Appl. No.: 945,238

[22] Filed: Sep. 25, 1978

Related U.S. Application Data

[63] Continuation-in-part of Ser. No. 761,647, Jan. 24, 1977, Pat. No. 4,130,027.

[51] Int. Cl.³ .............................................. G05G 1/14
[52] U.S. Cl. ...................................... 74/512; 74/560
[58] Field of Search ................. 74/512, 560, 513, 514; 267/160

[56] References Cited

U.S. PATENT DOCUMENTS

| | | | |
|---|---|---|---|
| 1,403,443 | 1/1922 | Paul | 74/513 |
| 2,087,254 | 7/1937 | Herold | 155/77 |
| 2,167,868 | 8/1939 | Best | 74/560 |
| 2,201,838 | 5/1940 | Shreffler et al. | 74/560 |
| 2,779,209 | 1/1957 | Estes et al. | 74/512 |
| 2,969,691 | 1/1961 | Cherry | 74/560 |
| 3,111,861 | 11/1963 | Young | 74/560 |
| 3,429,412 | 2/1969 | Wobrock | 74/512 |
| 3,584,857 | 6/1971 | Hipsher | 267/57.1 |

Primary Examiner—Kenneth Dorner
Attorney, Agent, or Firm—Harness, Dickey & Pierce

[57] ABSTRACT

A resilient lever assembly which incorporates spring action whereby the resilient portion of the assembly constantly urges a rigid lever against a lever movement resistance member connected to the lever. The action is accomplished by securing the resilient support to the fixed member in a rotational position such that the resilient support is stressed in the proper direction. The resilient support is in the form of an extension of the lever having spring-like properties and secured at its outer end to a fixed member. The lever movement resistance member may be in the form of a stop adjacent the rigid lever, or the valving of a vehicle brake booster against which the lever is urged. In one version of the invention, the resilient lever extension is secured to the fixed member by means of a U-shaped bracket. In another version, the resilient lever extension is secured directly to the fixed member. The resilient lever extension may be integrally formed with the lever as a unitary member or may be rigidly secured thereto.

17 Claims, 6 Drawing Figures

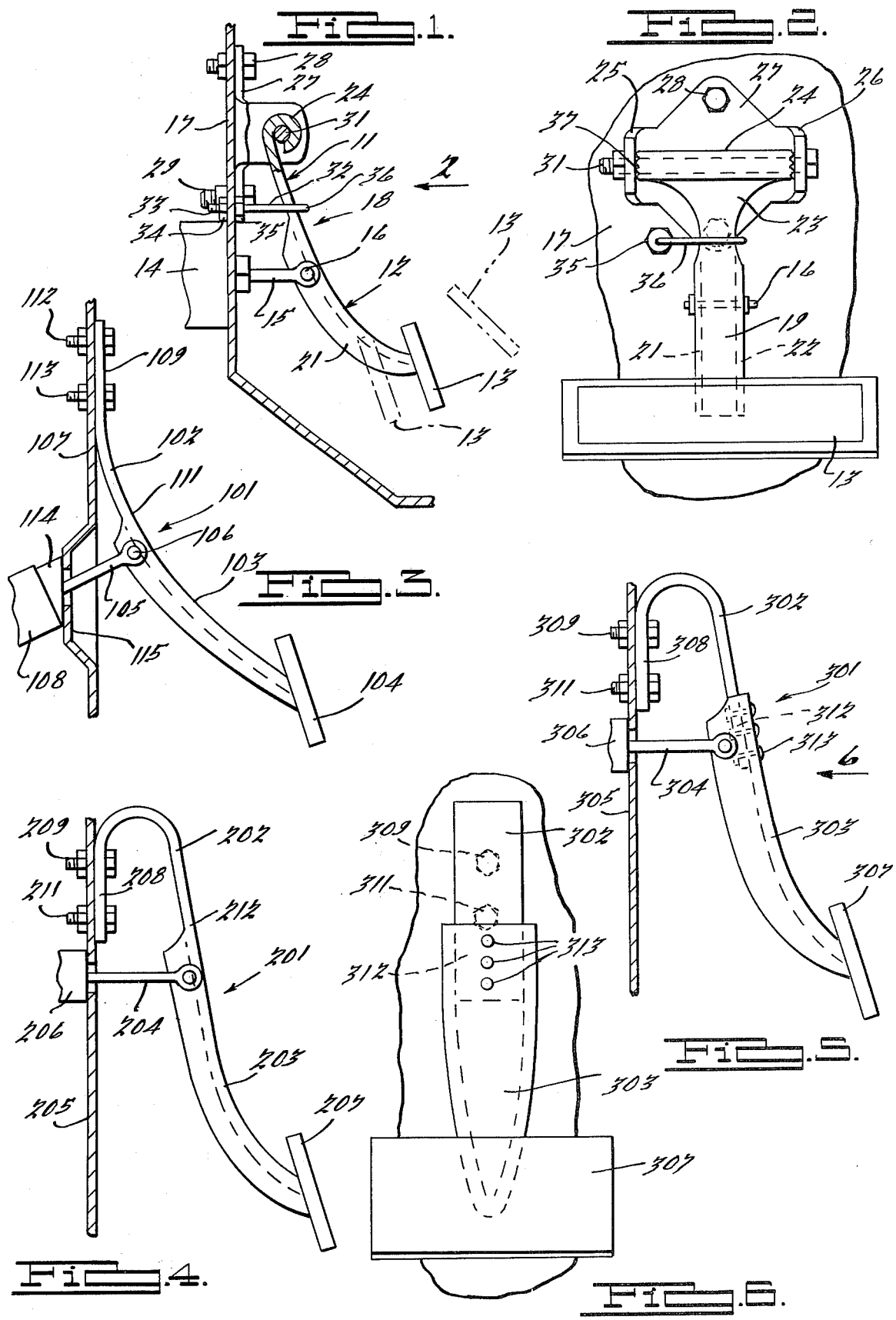

RESILIENT LEVER ASSEMBLY

This application is a continuation-in-part of application Ser. No. 761,647, filed Jan. 24, 1977 by the present applicant and entitled "Resilient Lever Assembly," now U.S. Pat. No. 4,130,027 issued Dec. 19, 1978.

BACKGROUND OF THE INVENTION

1. Field of the Invention

The invention relates to mountings for levers, and particularly, to lever mountings where it is desired to provide a spring action which constantly urges the lever in one direction against resistance means such as a stop. An example of such an assembly is a lever which supports an automotive brake pedal beneath the dashboard and adjacent the firewall. In small cars, especially those with front wheel drive, there is limited space for mounting a spring which will return the brake pedal to its upper position. Other areas of application for the invention could be pivoted handles or doors.

2. Description of the Prior Art

It is known to mount levers, handles, doors or the like on hinges and at the same time provide separate spring means urging the part in one direction against a stop. For example, in the case of a brake pedal it is known to provide a helical spring in addition to the pivot. However, compact cars, especially those which have front wheel drives and transaxles, have tight quarters under the dashboard which make it difficult to install the conventional parts used for this purpose.

Other patents discovered during the search which disclose bushings of the same general construction that are used as mounts for suspensions are Hipsher U.S. Pat. No. 3,584,857 which uses the bushing to support a leaf spring and Herold U.S. Pat. No. 2,087,254 which relates to a tilting mechanism for chairs.

BRIEF SUMMARY OF THE INVENTION

It is an object of the present invention to provide an improved construction for both mounting and spring-urging levers which eliminates the need for a separate spring, thus making it easier to install items such as brake pedal assemblies in small cars.

It is another object to provide an improved combined spring and mounting of this nature which is sturdy, reliable, compact and inexpensive to fabricate.

It is a further object to provide a novel and improved resilient lever assembly of this nature which, when applied to brake pedals, enhances the uniformity of the brake pedal "feel" from car to car during mass production, regardless of tolerance differences between vehicles.

It is also an object to provide an improved resilient lever assembly of this character in which the preloading may be negative as well as positive, positive preloading returning the lever to its original position while negative preloading is useful, for example, in holding a push rod against the valving of a vehicle brake booster, thus eliminating "lost motion" of the pedal as well as a "hump" in initial pedal movement.

It is a further object to provide an improved resilient lever assembly of this character having a minimum of parts which need to be assembled.

It is another object to provide a novel and improved resilient lever assembly of this character which minimizes the possibility of error when the unit is finally assembled in a vehicle or the like by ensuring that improper installation will be immediately noticeable.

Briefly, the invention comprises a resilient lever assembly having a rigid lever and a resilient support at one end thereof, lever movement resistance means connected to said lever and resisting movement thereof in one direction, a fixed member, said resilient support comprising an elongated spring-like element connected to said lever at one end and to said fixed member at the other end, and means securing said resilient support to said fixed member in a rotational position such that said support will be stressed in a direction constantly urging the lever against said lever movement resistance means.

BRIEF DESCRIPTION OF THE DRAWINGS

FIG. 1 is a side elevational view of a brake pedal for a car showing the manner in which the combined spring and pivot of one version of the invention is secured to the firewall of the car.

FIG. 2 is a rear elevational view taken in the direction of the arrow 2 of FIG. 1.

FIG. 3 is a view similar to FIG. 1 but showing a modified form of the invention in which the combined spring and pivot is secured directly to the firewall, and the U-shaped mounting bracket is eliminated, this version also showing the lever movement resistance means as comprising the valving of the braking system.

FIG. 4 is a side elevational view similar to FIG. 3 but in which the combined spring and pivot is looped.

FIG. 5 is a side elevational view of still another embodiment of the invention similar to that of FIG. 4 but in which the combined spring and pivot comprises a separate element secured to the rigid lever rather than a one piece construction and FIG. 6 is a rear elevational view taken in the direction of the arrow 6 of FIG. 5.

DESCRIPTION OF THE PREFERRED EMBODIMENTS

Referring to the embodiment of FIGS. 1 and 2, the combined pivot and spring of this invention is generally indicated at 11 and is shown as supporting a lever generally indicated at 12 for a brake pedal 13. The brake pedal is mounted in an automotive vehicle, and lever 12 is connected to the brake system shown partially at 14 by means of a rod 15 pivoted at 16 to the lever and extending through the firewall 17 of the vehicle. By stepping on the brake pedal, the driver of the car will move it from its solid line to its dot-dash line position in FIG. 1, operating the brakes. When the driver lifts his foot from the pedal, it will return to its solid line position.

Resilient support 11 comprises an elongated member having spring-like properties which is secured to one end of lever 12. In the embodiment of FIGS. 1 and 2, support 11 and lever 12 comprise a one piece construction and may be generally indicated as a resilient lever assembly 18. Lever 12 comprises a rigid channel shaped member with a web 19 and flanges 21 and 22 to which rod 15 is secured by pivot 16, pedal 13 being secured to the lower end of this lever. Resilient support 11 is in the form of an extension formed at the upper end of lever 12 and is heat treated and tempered to achieve the spring-like properties. It may also be otherwise shaped to obtain desired flexibility. The upper end is flared as indicated at 23 and terminates in a tubular or cylindrical portion 24. The length of this tubular portion is such that it may be disposed between and secured to the ears 25 and 26 of a bracket 27 which is secured to firewall 17 of the vehicle by bolts 28 and 29.

Unit 18 is secured to bracket 27 by a bolt 31 in such a position that, if spring-like portion 11 were to remain unstressed, pedal 13 would be held rearwardly of its normal brake-releasing (solid line) position, for example in the double dot-dash line position of FIG. 1. A stop 32 is provided for holding lever assembly 18 so that brake pedal 13 will be in its normal brake releasing position. This stop is shown as comprising an L-shaped member threaded at one end 33 and secured to firewall 17 by nuts 34 and 35 so that the distance of the hooked end 36 of member 32 with respect to the firewall may be adjusted. End 36 is an obstructing relation with lever assembly 18. When installing the assembly, after unit 18 has been secured in its position by tightening bracket ears 25 and 26 against teeth 37 at the end of sleeve 24, pedal 13 will be depressed from its double dot-dash line to its solid line position, and then stop 32 will be installed to hold the pedal in that position.

In operation of the assembly shown in FIGS. 1 and 2, spring-like extension 11 will be constantly under bending stress so as to hold lever assembly 18 against stop 32. At the same time, portion 11 will act as a frictionless support for lever 12 so that an operator pressing on pedal 13 will be able to actuate brake system 14. During the time the pressure is on pedal 13, extension 11 will be under increased stress while sleeve 24 is held stationary. When the brake pedal is released, this stress will tend to return lever 12 in a direction against stop 32, thus returning brake pedal 13 to its solid line position.

Instead of securing assembly 18 to bracket 27 so that the unstressed support 11 would hold pedal 13 in the double dot-dash line position of FIG. 1, the unit could be secured so that the unstressed support would hold the pedal in the single dot-dash line position. In other words, instead of positive preloading of support 11 in FIG. 1 (toward the double dot-dash line position), the preloading may be made negative instead. In this case, instead of the lever movement resistance means comprising stop 32 it would comprise the valving of the brake system 14, and in particular the brake booster valving (not shown), push rod 15 being effectively held against this brake booster valving by the negative preloading. This would eliminate what is commonly referred to as "lost motion" of the brake pedal which is an undesirable phenomenon, and could also eliminate a noticeable resistance to foot pressure when the pedal is first pressed, sometimes referred to as a "hump" in the pedal during its initial movement. Conceivably, the two-stage valve which is conventionally provided in the brake booster, could thus be eliminated or substantially modified to reduce its cost.

FIG. 3 illustrates another embodiment of the invention in which the U-shaped bracket is eliminated and the resilient support secured directly to the firewall. The resilient lever assembly is generally indicated at 101 and comprises a resilient support 102 and a lever 103. As before, the resilient support comprises a member of spring-like qualities which is formed as a one piece construction with lever 103, the latter having a channel-shaped construction. Brake pedal 104 is secured to the lower end of lever 103. A rod 105 is pivotally connected at 106 to lever 103 and extends through firewall 107 into the brake system shown partially at 108.

Resilient support 102 comprises a curved member the upper end 109 of which is flat and secured by bolts 111 and 113 to firewall 107. The portion of support 102 between portion 109 and its juncture 111 with lever 103 will act as the combined pivot and support for the brake pedal lever. During the construction of support 102, which is heat treated and tempered, it will be so formed that, when portion 109 is rigidly secured to firewall 107, the unstressed position of support 102 will hold brake pedal 104 away from its FIG. 3 position. Thus, it will have to be forced toward and held in this position by the lever movement resistance means. In the embodiment of FIG. 3, this lever movement resistance means will comprise the valving of brake system 108 and in particular the booster valving. Alternatively, lever assembly 101 could be held in its FIG. 3 position by a stop similar to stop 32 of the embodiment of FIGS. 1 and 2.

Lever assembly 101 in the embodiment of FIG. 3 has a pronounced inclination with respect to firewall 107. In order to assure proper movement of rod 105, it may be preferable to provide an inclined mounting 114 for brake system 108. Furthermore, a depression 115 may be formed in firewall 107 in the vicinity of rod 105 to accommodate movement of all portions of the lever assembly during operation.

The operation of the embodiment of FIG. 3 will be similar to that of FIGS. 1 and 2. Resilient support 102 will be constantly under bending stress so as to hold lever 103 against the lever movement resistance means, and will at the same time act as a frictionless support for lever 103 so that operator pressure on pedal 104 will actuate brake system 108. Release of the brake pedal will tend to return lever 103 to its solid line position.

FIG. 4 shows still another embodiment of the invention which is similar to that of FIG. 3 but in which the resilient support is of inverted U-shaped construction. The lever assembly is indicated generally at 201 and comprises a resilient lever support 202 and a lever 203. Again, the resilient support and lever are shown as a one piece construction with the resilient support being heat treated and tempered. A rod 204 is connected to lever 203 and extends through firewall 205 to brake system 206. The lower end of lever 203 carries a brake pedal 207.

Resilient support 202 is of inverted U-shaped and has a flat portion 208 secured against firewall 205 by bolts 209 and 211. The portion of support 202 between flat portion 208 and the juncture 212 would lever 203 will act as a combined pivot and resilient support. It will be observed that the construction of FIG. 4 permits a longer length of the resilient support for an equal height, than does the embodiment of FIG. 3, and that the lever 203 may be more closely parallel to firewall 205. The mounting of the embodiment of FIG. 4 will be the same as that described above with respect to FIG. 3. In other words, assembly 201 will be secured to firewall 205 in such a position that, when resilient support 202 is unstressed, pedal 207 will be away from its FIG. 4 position. During assembly, the pedal 207 will be forced into its FIG. 4 position and held there by the stop, whether this stop be a member similar to member 32 of FIGS. 1 and 2, or the brake booster valving.

FIGS. 5 and 6 show yet another embodiment of the invention which is similar to that of FIG. 4 but in which the resilient lever assembly is not of one piece construction but instead the combined pivot and spring is a separate member which is rigidly secured to the lever itself. The assembly is generally indicated at 301 and comprises a combined pivot and resilient support 302 and a rigid lever 303. An actuating rod 304 is pivotedly connected to lever 303 and extends through firewall 305 to the braking system shown partially at 306. A brake pedal 307 is secured to the lower end of lever 303 which is of channel-shaped construction and is tapered downwardly as seen in FIG. 6. Resilient support 302 is of inverted U-shaped construction and is heat treated and tempered as described above. It has a flat portion 308 which is rigidly secured to firewall 305 by bolts 309 and 311. The other end 312 of resilient support 302 overlaps the web portion of lever 303 and is secured to, for example by rivets 313. Thus, members 302 and 303 are rigidly joined together but the portion of member 302 between portions 308 and 312 acts as a combined pivot and resilient support.

As in the previous embodiments, assembly 301 will be mounted so that when support 302 is unstressed it will hold pedal 307 away from its FIG. 5 position. When assembling the unit, pedal 307 will be forced into its FIG. 5 position and held there by the lever movement resistance means or stop, whether this be a member such as shown at 32 in FIGS. 1 and 2 or a portion of the braking system. The operation of the unit shown in FIGS. 5 and 6 will thus be similar to that of the previous embodiments.

While it will be apparent that the preferred embodiments of the invention disclosed are well calculated to fulfill the objects above stated, it will be appreciated that the invention is susceptible of modification, variation and change without departing from the proper scope or fair meaning of the subjoined claims.

I claim:

1. In a motor vehicle brake assembly comprising a brake actuating element, the improvement comprising a resilient lever assembly comprising a rigid lever and a resilient support at one end thereof, stop means cooperable with said lever and resisting movement thereof in one direction to define a normal position, a fixed member, said resilient support comprising an elongated spring-like element connected to said lever at one end and to said fixed member at its other end, and means securing said resilient support to said fixed member in a rotational position such that said support will be stressed in a direction constantly urging the lever against said stop means, said spring-like element having sufficient resilience to deflect when an operator depresses said lever to actuate said brake actuating element and to return said lever to its normal position when operator pressure is released.

2. The combination according to claim 1, said means securing said resilient support to said fixed member comprising an elongated tubular element formed on said spring-like element, said fixed member comprising ears secured to the opposite ends of said elongated element.

3. The combination according to claim 2, said ears being formed on a U-shaped bracket.

4. The combination according to claims 1, 2, or 3 wherein said resilient lever assembly is mounted on a vehicle having a firewall between the engine and passenger compartment and above the floor board thereof.

5. The combination according to claim 4, said fixed member comprising bracket means having a portion secured to the vehicle firewall and ears secured to said elongated spring-like element.

6. The combination according to claim 4, said fixed member comprising said vehicle firewall.

7. The combination according to claim 6, said elongated spring-like element extending in curved fashion from said lever and having a flat portion rigidly secured to said vehicle firewall.

8. The combination according to claim 7, said elongated spring-like element being of inverted U-shape.

9. The combination according to claim 7, said elongated spring-like element and said lever being of one piece construction.

10. The combination according to claim 7, said elongated spring-like element and said lever being of two piece construction with the spring-like element overlapping and being rigidly secured by fastening means to said lever.

11. The combination according to claim 1, said stop means comprises a stop adjacent the lever, and means holding the stop in a position such that the elongated spring-like element will be stressed in a direction constantly urging the lever against the stop.

12. The combination according to claim 11, further provided with means for adjusting said stop so as to preselect the normal position of said lever.

13. The combination according to claim 12, said stop comprising a hooked lever, said stop adjusting means comprising a threaded portion on said lever and secured to said fixed member.

14. The combination according to claim 12, said stop being directly engageable by said lever.

15. The combination according to claim 14, said stop being engageable by an intermediate portion of said lever.

16. A rigid elongated automotive brake pedal lever assembly or the like mounted on a vehicle having a firewall between an engine and passenger compartment, said lever assembly comprising an elongated spring-like element having an upper end and a lower end, means rigidly securing the upper end of said element to said vehicle firewall, the element extending downwardly in curved fashion from said securing means, a rigid lever secured to and extending downwardly from the lower end of said spring-like element and carrying a brake pedal at a lower end thereof, a rod connected at one end to said lever assembly and extending through said firewall, a stop adjacent said lever, and means holding the stop in a position such that the spring-like element will be stressed in a direction constantly urging the lever against the stop.

17. An automotive brake pedal lever assembly as set forth in claim 16 wherein the spring-like element has a first end portion that is affixed to the vehicle firewall, an intermediate reversely bent portion at an upper end of said first portion and a second end portion extending downwardly from the opposite end of said intermediate portion, said rigid lever being secured to a lower end of said second end portion.

* * * * *